United States Patent
Hosokawa et al.

(10) Patent No.: US 10,486,375 B2
(45) Date of Patent: Nov. 26, 2019

(54) PRODUCTION METHOD AND PRODUCTION APPARATUS FOR FIBER-REINFORCED PLASTIC

(71) Applicant: TORAY INDUSTRIES, INC., Tokyo (JP)

(72) Inventors: Naofumi Hosokawa, Nagoya (JP); Hiroshi Odani, Nagoya (JP); Masato Furukawa, Nagoya (JP); Masaaki Yamasaki, Nagoya (JP); Akihiko Shirahase, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 710 days.

(21) Appl. No.: 14/779,394

(22) PCT Filed: May 21, 2014

(86) PCT No.: PCT/JP2014/063408
§ 371 (c)(1),
(2) Date: Sep. 23, 2015

(87) PCT Pub. No.: WO2014/192601
PCT Pub. Date: Dec. 4, 2014

(65) Prior Publication Data
US 2016/0059500 A1    Mar. 3, 2016

(30) Foreign Application Priority Data

May 31, 2013   (JP) .................................. 2013-114845

(51) Int. Cl.
*B29C 70/48*   (2006.01)
*B29C 70/44*   (2006.01)
(Continued)

(52) U.S. Cl.
CPC .............. *B29C 70/48* (2013.01); *B29C 70/44* (2013.01); *B29D 99/0007* (2013.01); *B29K 2101/10* (2013.01); *B29K 2105/089* (2013.01)

(58) Field of Classification Search
CPC .......................... B29C 70/462; B29C 33/0088
See application file for complete search history.

(56) References Cited

U.S. PATENT DOCUMENTS 5,190,773 A *   3/1993   Damon .................. B29C 43/32
                                                156/232
6,458,308 B1 *  10/2002  Kato ..................... B29C 43/203
                                                264/257
(Continued)

FOREIGN PATENT DOCUMENTS

JP    2007-1298 A     1/2007
JP    2009-39965 A    2/2009
(Continued)

OTHER PUBLICATIONS

International Search Report, issued in PCT/JP2014/063408, dated Aug. 19, 2014.

*Primary Examiner* — Matthew J Daniels
*Assistant Examiner* — Hana C Page
(74) *Attorney, Agent, or Firm* — Birch, Stewart, Kolasch & Birch, LLP (57) ABSTRACT

A production method for a fiber-reinforced plastic, in which a preform made of a reinforcing fiber substrate and having a three-dimensional shape and an inner mold operatable in a lateral direction different from an up-down direction are disposed in a mold cavity formed by an upper mold and a lower mold, and a state in which a plate thickness of the preform has been made greater than the thickness of a molded article to be obtained is brought about, and a matrix resin is injected and impregnated into the preform, and, after that, at least one of the upper mold and the lower mold is (Continued)

operated toward the other and the inner mold is operated in the lateral direction to pressurize the preform, whereby the thickness of the preform is controlled so as to be equal to a predetermined product's thickness, and subsequently the matrix resin is hardened by heating to obtain the molded article, and a production apparatus for a fiber-reinforced plastic for use in the production method.

8 Claims, 10 Drawing Sheets

(51) Int. Cl.
*B29D 99/00* (2010.01)
*B29K 101/10* (2006.01)
*B29K 105/08* (2006.01)

(56) References Cited

U.S. PATENT DOCUMENTS

| | | | |
|---|---|---|---|
| 7,708,546 B2* | 5/2010 | Lee | B29C 33/307 |
| | | | 425/356 |
| 9,387,628 B2* | 7/2016 | Chapman | B29C 70/462 |
| 9,669,570 B2* | 6/2017 | Godon | B29C 45/0025 |
| 2005/0170037 A1* | 8/2005 | Koike | B29C 45/6728 |
| | | | 425/595 |
| 2011/0241250 A1* | 10/2011 | Horizono | B29C 43/36 |
| | | | 264/258 |

FOREIGN PATENT DOCUMENTS

| | | |
|---|---|---|
| JP | 2011-31481 A | 2/2011 |
| JP | 2012-66397 A | 4/2012 |
| JP | 2012-214042 A | 11/2012 |

\* cited by examiner

PRODUCTION METHOD AND PRODUCTION APPARATUS FOR FIBER-REINFORCED PLASTIC

TECHNICAL FIELD

The invention relates to a production method and a production apparatus for a fiber-reinforced plastic (hereinafter, sometimes abbreviated as FRP) and, particularly, relates to production method and apparatus for a fiber-reinforced plastic in which, at the time of producing a three-dimensionally shaped and thick-walled FRP molded article, the fiber volume content rate (hereinafter, sometimes abbreviated as Vf) is made comparatively high, and that state can be easily controlled, and in which an FRP molded article for use as a structural body for which high quality is demanded, such as component parts of aircrafts, can be produced by an RTM (Resin Transfer Molding) method using a simple apparatus.

BACKGROUND ART

As a method for producing FRP, there is known an RTM method that molds an FRP molded article having a predetermined thickness by disposing a reinforcing fiber substrate in a mold cavity formed by an upper mold and a lower mold, pressurizing the molds to clamp the molds, injecting and impregnating a pressured matrix resin into the reinforcing fiber substrate, and then hardening the impregnated resin. As a technology for molding a particularly large FRP structural body using the RTM method that uses an upper mold and a lower mold, there has been proposed a multipoint injection technology in which in order to achieve the purpose of favorably injecting and impregnating a matrix resin into a reinforcing fiber substrate over a large area, the resin is injected substantially simultaneously through a plurality of sites (e.g., Patent document 1).

Besides the RTM method that uses an upper mold and a lower mold as described above, there is known another RTM method that uses a bag material. In this method, instead of an upper mold, a bag material, such as a film made of resin, is used, and a reinforcing fiber substrate set on a lower mold is covered with the bag material, and the bag material and the lower mold are tightly closed with a seal material, the inside covered with the bag material is depressurized by vacuum suction, and, utilizing the depressurized state, a matrix resin is injected into the inside so as to impregnate into a reinforcing fiber substrate, and then the impregnated resin is hardened. Furthermore, in the RTM method that uses a bag material, there is known a technology in which after resin impregnation, surplus resin in the reinforcing fiber substrate is sucked and removed through a suction line disposed inside the bag material so as to control the Vf (e.g., Patent document 2).

Furthermore, in the RTM method that uses an upper mold and a lower mold as described above, it is usual to inject and impregnate a pressurized matrix resin into a reinforcing fiber substrate during a state in which an internal dimension height of a mold cavity has been adjusted so that the thickness of the reinforcing fiber substrate is substantially equal to the thickness of a molded article that is to be obtained by molding, a so-called product. However, with regard to the RTM method that uses an upper mold and a lower mold, as a technology for applying the method to the molding of a large-size FRP structural body, there is known a technology in which, in a state where a reinforcing fiber substrate has been disposed within a mold cavity formed by an upper mold and a lower mold and an internal dimension height of a mold cavity has been made larger than the thickness of the product, a resin is injected and impregnated into the reinforcing fiber substrate, and, after that, the resin injected and impregnated in surplus into the reinforcing fiber substrate is sucked and removed, and at least one of the upper mold and the lower mold is pressurized toward the other so as to control the internal dimension height of the mold cavity so that the thickness of the reinforcing fiber substrate becomes equal to the thickness of the product, and, in that state, the resin is hardened (e.g., Patent document 3). Use of the technology disclosed in Patent document 3 makes it possible to efficiently produce tabular molded articles that have a large size, a large thick-walled, and a high Vf.

Furthermore, a technology that uses thermal expansion of a rubber or an elastomer as a supply source of pressure needed at the time of molding of FRP is known (e.g., Patent documents 4 and 5). According to the technology disclosed in Patent document 4, a rubber layer is caused to expand by heating so as to extrude surplus resin, so that it becomes possible to produce a structural body in which a stable amount of resin has been deposited and solidified. According to the technology disclosed in Patent document 5, it becomes possible to produce large-size molded articles in a prepreg molding method without using an autoclave apparatus.

PRIOR ART DOCUMENTS

Patent Documents

Patent document 1: Japanese Unexamined Patent Publication (Kokai) No. 2005-246902
Patent document 2: Japanese Patent No. 4104413
Patent document 3: International Publication WO 2011/043253
Patent document 4: Japanese Unexamined Patent Publication (Kokai) No. SHO 62-211112
Patent document 5: Japanese Unexamined Patent Publication (Kokai) No. HEI 4-294126

SUMMARY OF THE INVENTION

Problems to be Solved by the Invention

In the foregoing RTM method that uses an upper mold and a lower mold as disclosed in Patent document 1, because the reinforcing fiber substrate has already been pressurized at the time of resin injection and impregnation, the reinforcing fiber density of the reinforcing fiber substrate is high and, therefore, it is correspondingly hard for the resin to flow in the reinforcing fiber substrate. Therefore, the resin impregnation distance is restricted, leading to a problem that the thickness of a product is restricted.

Furthermore, in the RTM method that uses a bag material as disclosed in Patent document 2, because the tight closure with the bag material is needed every time a molded article is molded, there is a problem that lots of production time and labor are required. Further, because the bag material and the seal material for tight closure need to be disposed of in every molding cycle, there is a problem that waste materials are produced and costs become large. Furthermore, because the pressurization source for the matrix resin is only atmospheric pressure, there is a limit in the thickness of the reinforcing fiber substrate into which resin can be impregnated.

Furthermore, in the technology disclosed in Patent document 3, because the operations of the mold die are in one direction, that is, an up-down direction, it is difficult to apply the technology to an aircraft component part having a three-dimensional shape, for example, a component part of an aircraft, and the like, that is composed of a tabular base portion and a reinforcement portion.

Furthermore, in the case where the technology disclosed in Patent document 4 or Patent document 5 is directly used as an RTM method, a preform contacts a rubber or an elastomer, and variations occur in the quality of molded surfaces of products. Furthermore, because the plate thickness of the molded article is not controlled, it is difficult to apply the technology to aircraft component parts about which it is required that high-quality and high-precision products be produced with good reproducibility.

Therefore, a task of the invention is to provide production method and apparatus for an FRP excellent in molding operation characteristic in which, particularly at the time of producing a three-dimensionally shaped and thick-walled molded article, a resin can be easily impregnated in a short time into a preform present in a desired state, and, with regard to the molded article to be obtained, a control can be accomplished such as to achieve a high Vf.

Means for Solving the Problems

In order to accomplish the foregoing task, the production method for an FRP of the invention adopts a construction as follows. That is, the production method for an FRP of the invention is a production method for a fiber-reinforced plastic in which a preform made of a reinforcing fiber substrate and having a three-dimensional shape and an inner mold operatable in a lateral direction different from an up-down direction are disposed in a mold cavity formed by an upper mold and a lower mold, and a state in which a plate thickness of the preform is greater than a thickness of a molded article to be obtained is brought about, and a matrix resin is injected and impregnated into the preform, and, after that, at least one of the upper mold and the lower mold is operated toward the other and the inner mold is operated in the lateral direction to pressurize the preform so that the thickness of the preform is controlled so as to be equal to the thickness of the molded article to be obtained, and subsequently the matrix resin is hardened by heating to obtain the molded article.

Furthermore, in order to accomplish the foregoing task, the production apparatus for an FRP of the invention adopts a construction as follows. That is, the production apparatus for an FRP of the invention is a production apparatus for a fiber-reinforced plastic which includes: an upper mold and a lower mold which are capable of forming a mold cavity for disposing a preform that is made of a reinforcing fiber substrate and that has a three-dimensional shape and at least one of which is operatable toward the other; an inner mold operatable within the mold cavity so as to pressurize the preform in a lateral direction different from an up-down direction; resin injection means for injecting a matrix resin into the mold cavity; and heating means for hardening the matrix resin.

Advantageous Effects of the Invention

According to the production method and apparatus for an FRP in accordance with the invention, in the case where a three-dimensionally shaped molded article, for example, a molded article composed of a tabular base portion and a reinforcement portion, during the state in which the thickness of the preform has been adjusted so as to achieve a low Vf that allows full impregnation with a resin, the resin is injected and impregnated into the preform, and then, as for the up-down direction, at least one of the upper mold and the lower mold is operated toward the other so that the internal dimension height of the mold cavity is adjusted, and, as for a lateral direction other than the height direction, the inner mold disposed in the mold cavity and being operatable in the lateral direction is operated in the lateral direction so as to adjust the dimension of the mold cavity in the lateral direction, whereby the thickness of the three-dimensionally shaped preform disposed within the mold cavity can be adjusted to a dimension that corresponds to the thickness of the molded article to be obtained by molding. Therefore, a three-dimensionally shaped molded article controlled to a high Vf can be produced in a short time, using a simple apparatus, while the molding operation characteristic and the productivity are considerably improved over the existing art.

DESCRIPTION OF PREFERRED EMBODIMENTS

Hereinafter, desirable embodiments of the invention will be described with reference to the drawings. However, the embodiments presented below are mere exemplifications of desirable embodiments of the invention, and the invention is not limited to these embodiments.

Figure 1:
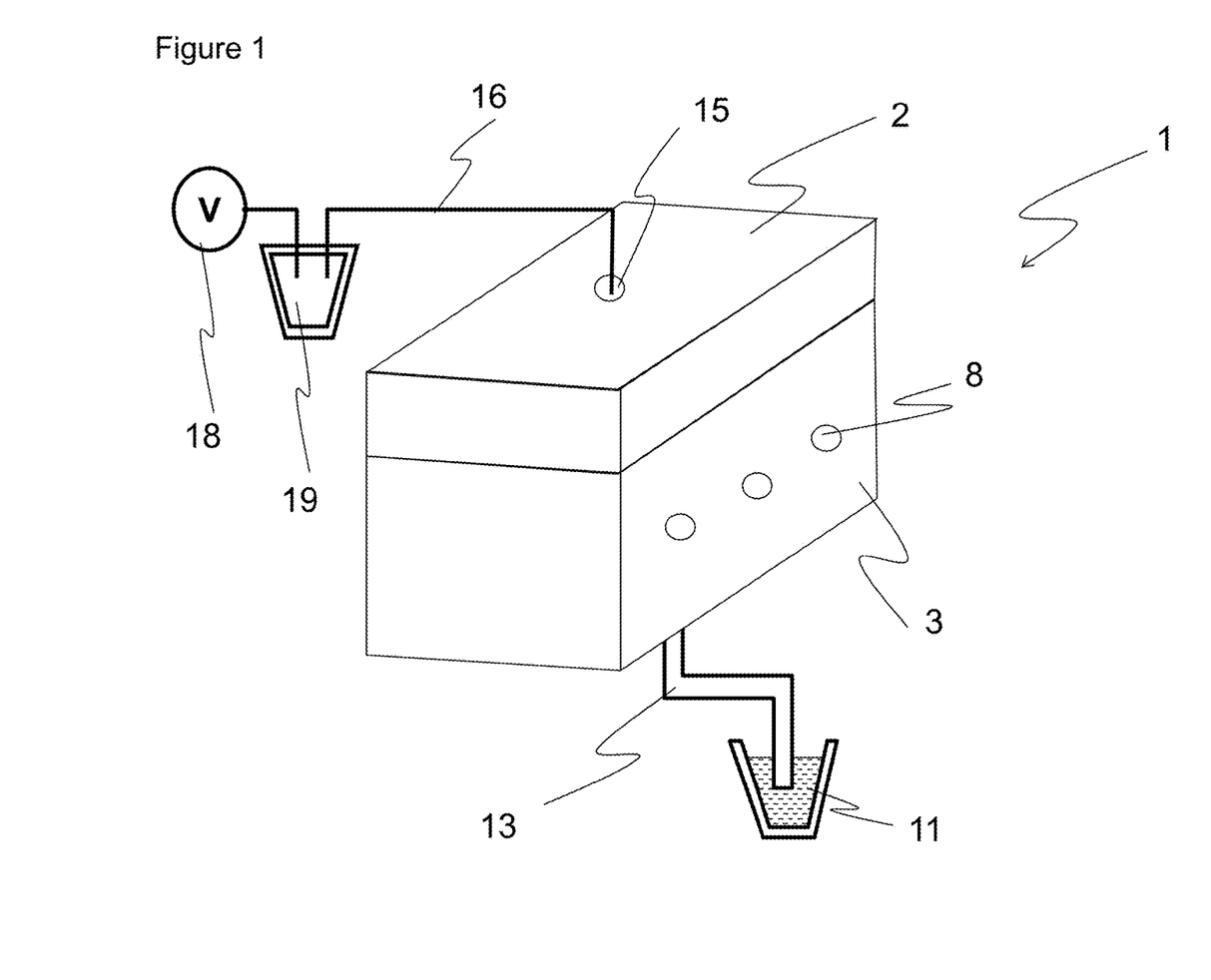
FIG. 1 is a general perspective view showing a whole picture of a production method for use in a production method for an FRP according to an embodiment of the invention.
Figure 2:
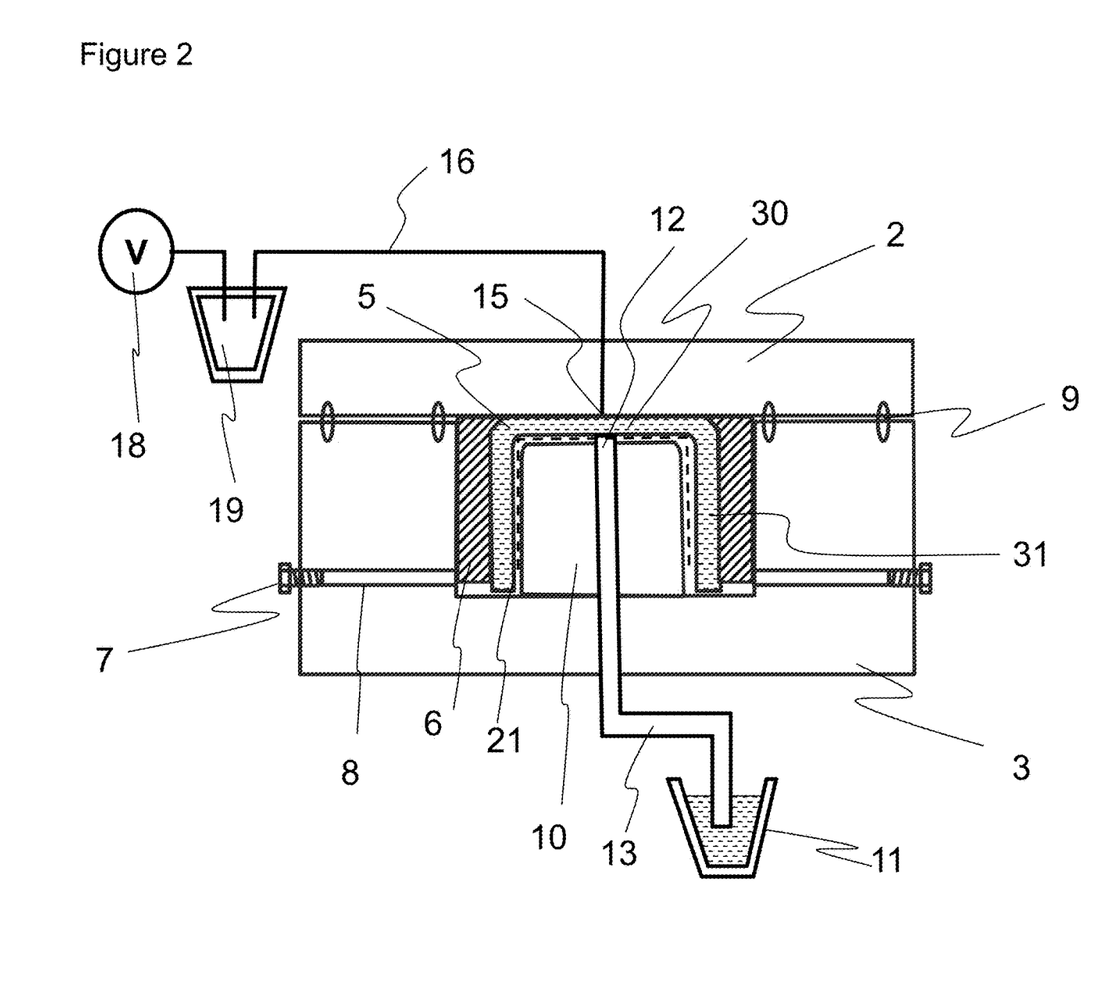
FIG. 2 is a longitudinal sectional view of the production apparatus for an FRP shown in FIG. 1.
Figure 3:
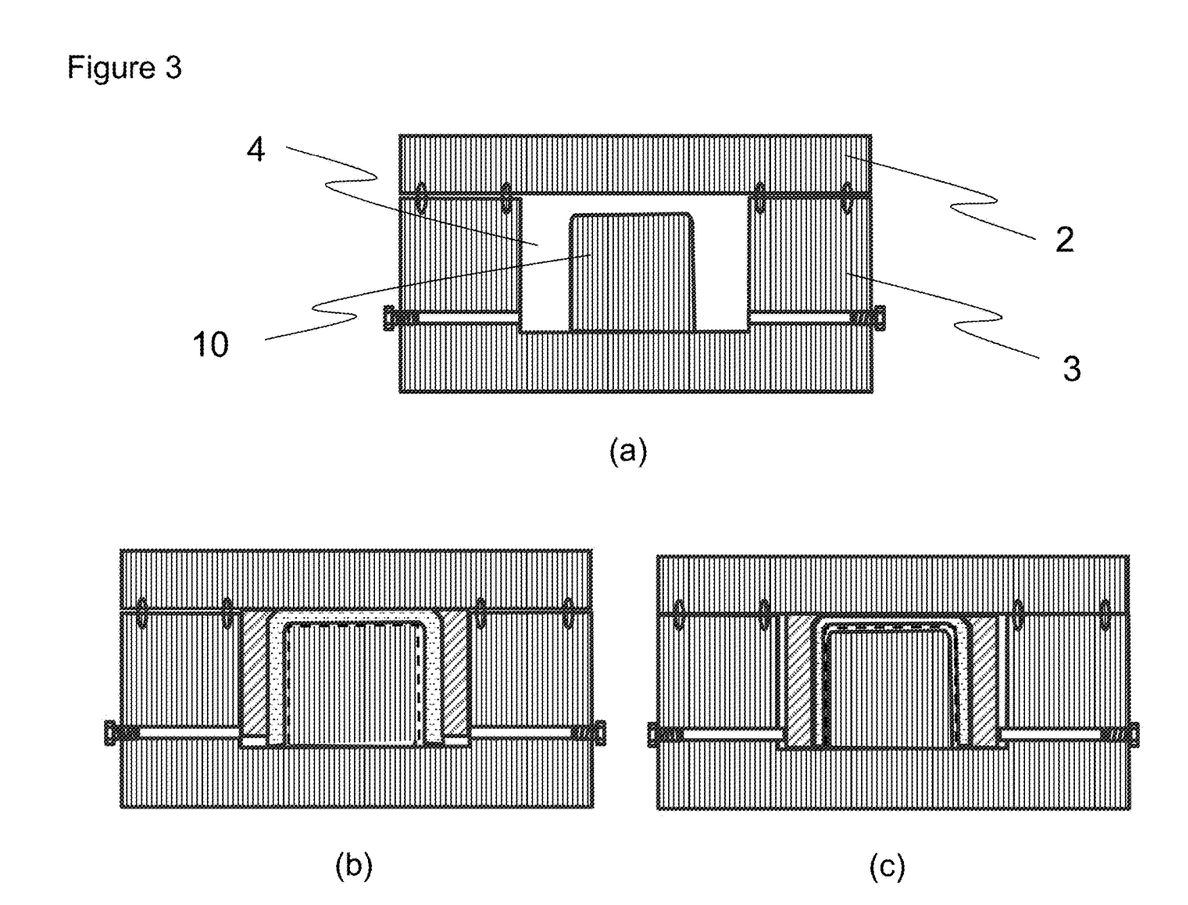
FIG. 3 is a general longitudinal sectional view of a mold die, showing (a) a mold cavity formed by an upper mold and a lower mold before setting a preform and an inner mold, (b) the position of an inner mold before impregnation with a matrix resin, and (c) the position of the inner mold at the time of hardening the matrix resin.

A first embodiment of the invention will be described using FIGS. 1 to 3. FIG. 1 shows a general perspective view of a production apparatus for use in a production method for an FRP according to an embodiment of the invention, and FIG. 2 shows a longitudinal sectional view thereof. Furthermore, a general longitudinal sectional view of a mold die in the production apparatus for an FRP shown in FIGS. 1 and 2 is shown in FIG. 3. In FIGS. 1 to 3, a production apparatus 1 for an FRP has an upper mold 2 and a lower mold 3. In this embodiment, the upper mold 2 is a planar plate. As for a sectional shape of the lower mold 3, a protruded portion 10 is formed in a recess-shaped frame body. A sectional shape of a mold cavity 4 formed by the upper mold 2 and the lower mold 3 is a C shape.

In the invention, as for the upper mold 2, the lower mold 3, and the inner mold 6, if they have necessary strengths and rigidities, the materials and the configurations thereof are not particularity limited. However, in order to enhance the accuracy of molded products and the surface quality of the molded products, it is desirable that the materials thereof be a metal; for example, the materials are preferred to be steel and, from the viewpoint of thermal expansion, are more preferred to be Invar.

In this embodiment, as a three-dimensionally shaped preform, a preform 5 that has a C-shaped sectional shape composed of a base portion 30 and a reinforcement portion 31 and that is made of a reinforcing fiber substrate is disposed within the mold cavity 4 so as to lie along the protruded portion 10 of the lower mold. An inner mold 6 having a shape that corresponds to that of the protruded portion 10 is disposed between the preform 5, at the two reinforcement portions 31 in the mold cavity, and side walls of the lower mold 3. The base portion presents a horizontal side surface, and the reinforcement portions present vertical side surfaces.

In the invention, the inner mold 6 is capable of being operated so as to pressurize the preform within the mold cavity at least in a lateral direction different from up-down directions. Furthermore, in this embodiment, it is preferable that the inner mold 6 have such a size that no void space is formed in the mold cavity 4 at the time point before a resin injected. The preform 5 has been formed so that the thickness thereof is greater than the thickness of a molded article to be obtained, that is, the thickness of a product (i.e., in the state of having a Vf lower than the Vf of the product).

The side walls of the lower mold 3 are provided with through holes 8, and bar-shaped bodies 7 extend through the through holes 8 and contact the inner mold 6. In this embodiment, it is appropriate that each bar-shaped body 7 be constituted by a male threaded bolt and each through hole 8 be provided with a female thread. Although the through holes are provided in the lower mold in FIG. 1 and FIG. 2, through holes may be provided in one or both of the upper mold and the lower mold, corresponding to the shapes of the molded article and the mold die.

O-rings 9 as seal means that extend all around the perimeter of the mold cavity 4 are provided between the upper mold 2 and the lower mold 3. Via the O-rings 9, the mold cavity 4 is tightly closed by the upper mold 2 and the lower mold 3. Because the O-rings 9 are used, void space is formed between the upper mold 2 and the lower mold 3, so that at least one of the upper mold 2 and the lower mold 3 is operable toward the other. Then, because there is void space between the upper mold 2 and the lower mold 3, the preform can be caused to be in a low Vf state at the time of impregnation with a matrix resin, so that the flow path for the matrix resin becomes larger. By pressing the upper mold 2 and the lower mold 3 or depressurizing the mold cavity 4, one of the upper mold 2 and the lower mold 3 is operated toward the other, and therefore the amount of squeeze of the O-rings 9 as seal means increases and the thickness of the base portion of the preform 5 gradually becomes thinner until surfaces of the upper mold 2 and the lower mold 3 contact each other and stop. Thus, a control is performed such that a predetermined product's thickness is obtained.

As for the O-rings, the material and the configuration thereof are not particularly limited. However, as the material thereof, for example, nitrile rubber, styrol rubber, fluorine rubber, or silicone rubber can be used; in particular, because a material whose mold release characteristic is high is preferable, use of silicone rubber is preferable.

Furthermore, in this embodiment, the lower mold 3 is provided with a resin injection opening 12 as resin injection means for injecting the matrix resin into the mold cavity 4. With a state where the thickness of the preform 5 is greater than the thickness of the product (that is, a state where the Vf of the preform is lower than the Vf of the product to be obtained), the matrix resin held in a resin pot 11 is injected, via a resin injection line 13, through the resin injection opening 12 formed in the lower mold 3 and connected to the resin injection line 13, toward the preform 5 within the mold cavity 4, for impregnation.

Incidentally, in the invention, as shown in FIG. 2, a resin diffusion medium 21 may be interposed between the lower mold 3 and the preform 5 so that, via the resin diffusion medium 21, the matrix resin can be injected and impregnated into the preform 5 in a more uniformly diffused state. As for the resin diffusion medium 21, if the resin diffusion medium 21 has a function of promoting diffusion of the resin, the material and the configuration thereof are not particularly limited. However, the resin diffusion medium 21 is preferred to be a sheet-shaped medium in which the flow resistance to the resin is a low resistance that is less than or equal to $\frac{1}{10}$ of the flow resistance occurring in the case where the resin flows in the reinforcing fiber substrate that constitutes the preform 5 and, concretely, is preferred to be a medium which is of a mesh woven fabric made of polyethylene or polypropylene and whose aperture is less than or equal to 400 in mesh number (greater than or equal to 63.5 μm in pitch).

Furthermore, in the apparatus shown in FIGS. 1 and 2, using a vacuum pump 18, via a resin trap 19, the inside of the mold cavity 4 is brought to a depressurized state by suction through a vacuum suction opening 15 formed in the upper mold 2. Utilizing the depressurized state, the matrix resin is injected and impregnated into the preform 5, from the resin injection opening 12. However, in the invention, instead of the injection and impregnation utilizing this depressurized state, pressurized injection of the matrix resin as described below is also possible. Combined use of the pressurized injection and the injection utilizing the depressurized state is also possible. If the inside of the mold cavity is brought to a depressurized state, residual air can be excluded and deficiencies, such as voids in a molded article, can be decreased.

It is desirable that the resin pot 11, the resin trap 19, the resin injection line 13, and the vacuum suction line 16 have a warming function or a keeping-warm function in order to maintain such a resin viscosity that good resin impregnation can be achieved. As for the resin injection opening 12, the resin injection line 13, the vacuum suction opening 15, and the vacuum suction line 16, it is desirable that conditions, such as the numbers thereof, the diameters thereof, and the positions thereof, be determined taking into consideration the capability of the resin diffusion medium 21 and the size and shape of the molded article. Incidentally, it is desirable that the vacuum suction opening 15 be provided at a position that is the last in the preform to be impregnated with the resin.

Before long, the matrix resin is impregnated into the entire preform 5. After the impregnation is completed, the matrix resin flows out from the vacuum suction opening 15 toward the vacuum suction line 16. At the time of injection and impregnation of the matrix resin, the thickness of the preform is greater than the thickness of a targeted high-Vf product, so that during this state, the matrix resin is not hardened yet but the Vf during this state is lower than the Vf of the targeted high-Vf product. Therefore, the bulk density of the reinforcing fiber in the preform at the time of injecting and impregnating the resin is lower than the bulk density of the reinforcing fiber in the targeted high-Vf molded article and therefore the resin easily flows within the preform 5, so that even a comparatively thick preform can be sufficiently favorably impregnated with the matrix resin without applying high injection pressure. That is, first, a state in which the preform has been easily and sufficiently favorably impregnated with the matrix resin despite a low-Vf state is formed.

After the preform 5 in a low-Vf state is sufficiently favorably impregnated with the matrix resin in this manner, the resin injected and impregnated in surplus in the preform 5 is sucked and removed via the vacuum suction line 16 for the resin, which is used as described above. If the resin reaches the vacuum suction opening 15 before impregnation of the entire preform, the resin is discharged from the vacuum suction opening 15, so that sometimes the impregnation of the resin into the preform stops progressing and yet-to-be-impregnated portions occur. In order to avoid such a deficiency, it is desirable that a plurality of vacuum suction openings 15 be disposed and the vacuum suction line 16 extending from a vacuum suction opening 15 which has come to discharge the resin be closed by using a clamp or the like. At this time, a difference pressure between the internal pressure of the mold cavity 4 depressurized by vacuum suction and the atmospheric pressure acting on an external surface of the upper mold 2 is utilized so that the upper mold 2 is pressed down to pressurize the preform 5, whereby the internal dimension height of the mold cavity 4 is controlled so that the thickness of the preform 5 disposed in the mold cavity 4 becomes equal to the thickness of the product.

Then, the inner mold 6 is pressed using the bar-shaped bodies 7 from outside the mold cavity 4 to operate the inner mold 6 by a predetermined amount in a lateral direction other than the up-down directions (the height direction in FIG. 2) so as to control a dimension of the mold cavity 4 in the lateral direction in such a manner that the thickness of the preform 5 disposed in the mold cavity 4 becomes equal to the thickness of the product. Subsequently, the matrix resin is hardened by heating via heating means.

As for the bar-shaped bodies 7, if the bar-shaped bodies 7 have a structure that makes it possible to press the inner mold, the configuration thereof is not particularly limited. However, for example, the bar-shaped bodies 7 may be provided with a structure in which compression is carried out by a hydraulic or pneumatic cylinder. Furthermore, in order to more accurately control the plate thickness of the molded article, it is preferable that the amount of displacement of the bar-shaped bodies can be measured. For example, by providing a bar-shaped body 7 as a male threaded bolt and providing the through hole 8 with a female thread, it is possible to rotate the bar-shaped body 7 in the through hole and control the amount of movement of the bar-shaped body 7 by the number of rotations thereof. The female thread may be provided inside the through hole 8, or a nut-shaped jig on which a female thread has been cut may be fixed to the through hole 8.

FIG. 3 (a) shows a state before a preform and an inner mold are set in a mold cavity formed by the upper mold 2 and the lower mold 3 in this embodiment, and FIG. 3(b) shows a state in which the preform 5 and the inner mold 6 have been set in the mold cavity before the matrix resin is impregnated. In the state of FIG. 3 (b), after the matrix resin is injected and impregnated into the preform 5, at least one of the upper mold 2 and the lower mold 3 is operated toward the other and the inner mold 6 is pressed using the bar-shaped bodies 7 from outside the mold cavity 4 so that the inner mold 6 is operated a predetermined amount in the lateral direction to bring about a state of FIG. 3(c). Then, the matrix resin is hardened by heating via the heating means.

Usually in the invention, thermosetting resin (e.g., epoxy resin) is used as the matrix resin, and the hardening of the matrix resin is carried by heating means. As the heating means, it suffices that publicly known means (whose illustration is omitted), such as a heat medium or a heater provided within the mold die, is used.

Thus, as the matrix resin impregnated in the preform 5 whose thickness is kept equal to a predetermined product's thickness is hardened, a targeted high-Vf FRP molded article is obtained. It suffices that after the hardening of the resin is completed, the mold is opened and the molded article is taken out.

Incidentally, the lateral direction different from the up-down directions according to the invention includes all the directions other than the up-down mold clamping directions of the upper mold 2 and the lower mold 3, and usually means a plate thickness direction of the reinforcement portions 31 corresponding to the three-dimensional shape of the preform 5.

As for the preform 5, if the preform 5 has a three-dimensional shape and is constituted from a reinforcing fiber substrate that has been given a shape, the configuration of the preform 5 does not particularly matter; however, in order that the plate thickness thereof at the time of the matrix resin impregnation be fixed to a state in which the thickness is greater than the product thickness, it is preferable that a plurality of reinforcing fiber substrates be adhered together via a binder (adhesive resin) and be fixed in shape so as to be great in bulk. Furthermore, in order for the preform 5 to deform so as to be thinner in plate thickness after the matrix resin impregnation, the binder is preferred to be one that has a characteristic that it dissolves in the matrix resin and is preferred to be one in which a thermoplastic resin is a main component. The reinforcing fiber substrate is a sheet-shaped substrate constituted of reinforcing fiber. As the reinforcing fiber substrate, woven fabric, knitted fabric, non-woven fabric, and one-direction substrates that are constituted of reinforcing fiber can be cited as examples. As the reinforcing fiber, it is preferable to use, for example, carbon fiber, glass fiber, aramid fiber, Kevlar fiber, etc. Furthermore, the reinforcing fiber substrate satisfies the fiber orientation and the fiber amount that are determined beforehand by design. By using the reinforcing fiber substrate commensurate with the design, the strength and rigidity thereof along the fiber orientation is more effectively developed.

Pressurizing the preform 5 by operating at least one of the upper mold 2 and the lower mold 3 toward the other and also operating the inner mold 6 in the lateral direction may be performed after the matrix resin is impregnated thoroughly in the preform 5, and, if a sufficient amount of the resin has been injected, may be performed in mid-course of the impregnation into the preform 5. If the preform 5 is pressurized in mid-course of the impregnation, the surplus amount of the resin can be reduced and the waste of the resin can be cut down.

Figure 4:
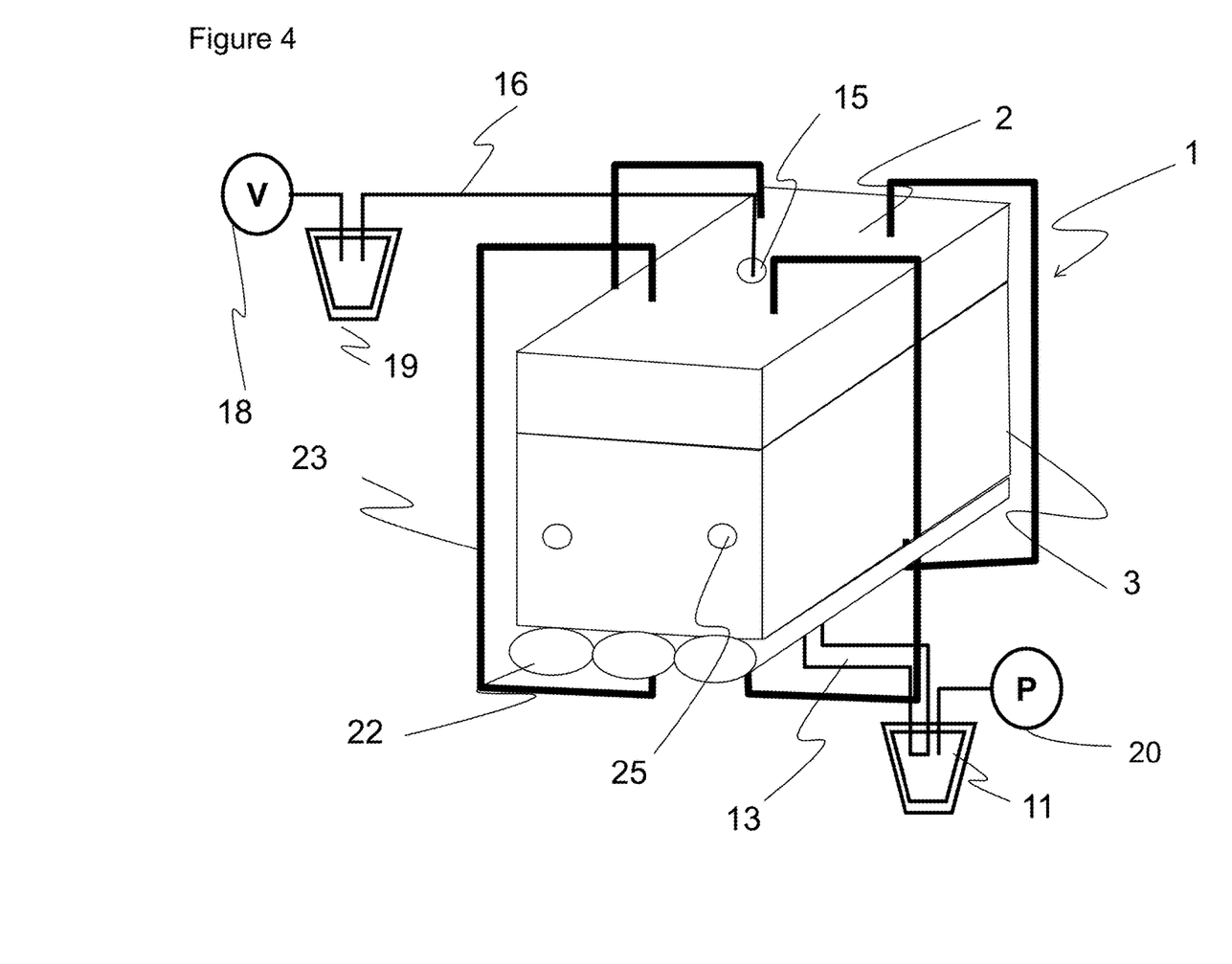
FIG. 4 is a general perspective view showing a whole picture of a production apparatus for use in a production method for an FRP according to another embodiment of the invention.
Figure 5:
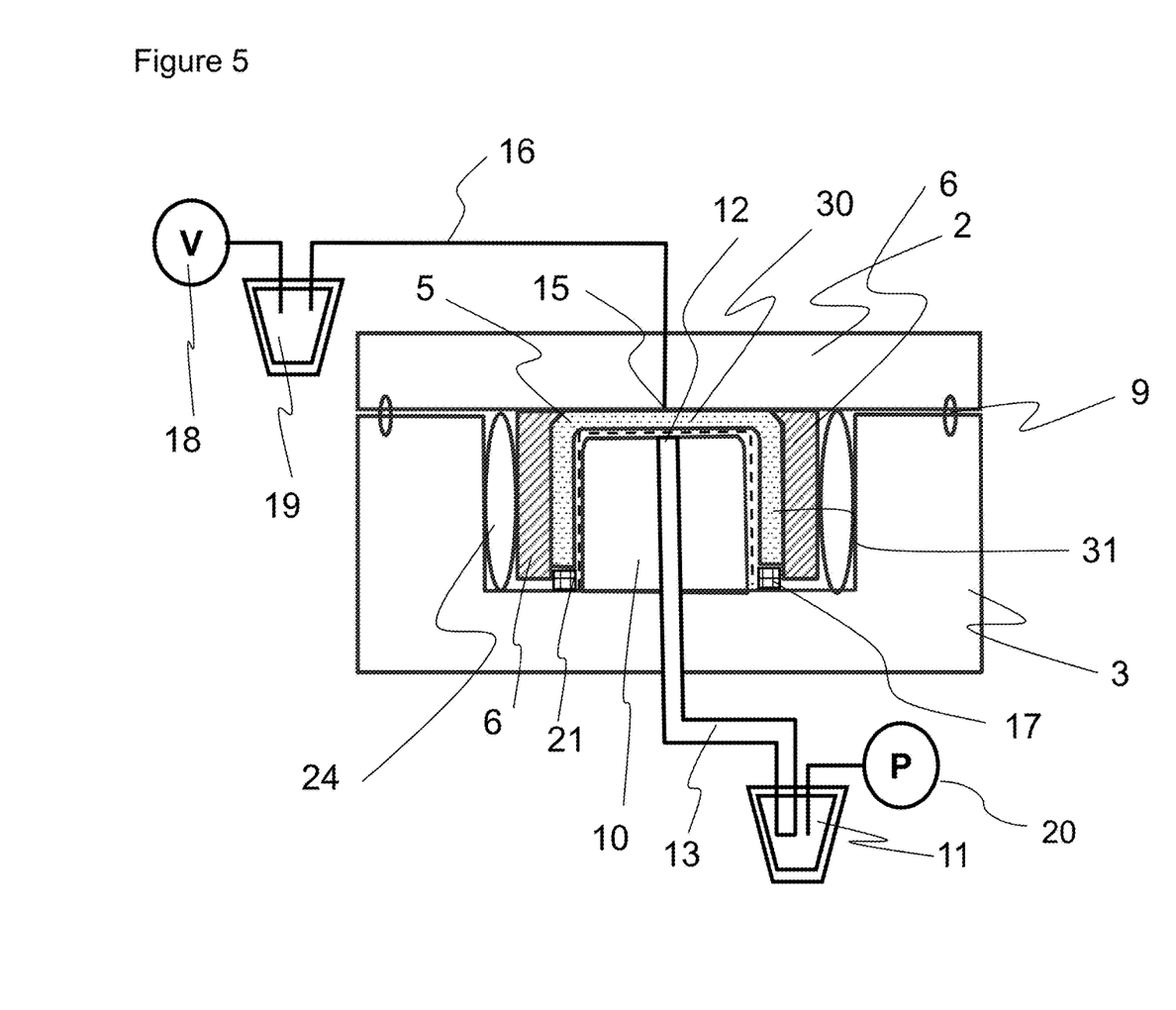
FIG. 5 is a longitudinal sectional view of the production apparatus for an FRP shown in FIG. 4.

FIG. 4 shows a general perspective view of a production apparatus for an FRP according to a second embodiment. A longitudinal sectional view thereof is shown in FIG. 5. As in the first embodiment, a sectional shape of a mold cavity 4 formed by an upper mold 2 and a lower mold 3 is a C shape. Within the mold cavity 4, a preform 5 that has a C-shaped sectional shape composed of a base portion 30 and reinforcement portions 31 and that is made of a reinforcing fiber substrate is disposed, as a three-dimensionally shaped preform, so as to lie along a protruded portion 10 of the lower mold.

There is exemplified a mode in which a plurality of bladder bags 22 are disposed at a lower side of the lower mold 3 positioned on an outer side opposite to the mold cavity 4 of the lower mold 3 and a pressurized fluid (e.g., compressed air) is introduced into the insides of the bladder bags 22 to expand the bladder bags 22 so that the lower mold 3 is operated toward the upper mold 2 side, whereby the preform is pressurized. At this time, in order to fix the position of the upper mold 2, upper mold/lower mold fixing jigs 23 are used. Of course, while the lower mold 3 is operated so as to pressurize the preform, the suction and removal of surplus resin is also performed via a vacuum suction line 16. Incidentally, in FIG. 5, the bladder bags 22 and the upper mold/lower mold fixing jigs 23 are omitted from presentation.

Then, in this embodiment, at the two reinforcement portions 31 of the preform 5 in the cavity 4, between the preform 5 and side walls of the lower mold 3 there are disposed an inner mold 6 being movable and having a shape that corresponds to a protruded portion 10 and an expandable bag body 24. That is, the bag body 24 is disposed in a gap between the inner mold 6 and the lower mold 3, and the bag body 24 can be expanded by enclosing in it a pressurized fluid (e.g., compressed air) through a pressurized fluid introduction hole 25 for the bag body. The bag body, although disposed in the gap between the inner mold and the lower mold in FIG. 5, may be disposed in a gap between the inner mold and the upper mold corresponding to the shapes of the molded article and the mold die.

Furthermore, as shown in FIG. 5, in the invention, a spacer 17 may be disposed between the inner mold 6 and the protruded portion 10 of the lower mold. It is preferable that at a time point before the matrix resin is injected, a certain amount of the pressurized fluid be enclosed in the bag body 24 to expand the bag body 24 so that the bag body 24 and the inner mold 6 take up a capacity of the mold cavity 4 to such an extent that no void space remains in the mold cavity 4.

As in the first embodiment, between the upper mold 2 and the lower mold 3 there is an O-ring 9 as seal means that extends all around a perimeter of the mold cavity 4. Via the O-ring 9, the mold cavity 4 is tightly closed by the upper mold 2 and the lower mold 3.

Furthermore, similarly to the first embodiment, as resin injection means for injecting the matrix resin into the mold cavity, a resin injection opening 12 is provided in the lower mold 3. With a state where the thickness of the preform 5 is greater than the thickness of the product (that is, a state where the Vf of the preform is lower than the Vf of the product to be obtained), the matrix resin held in a resin pot 11 is injected, via a resin injection line 13, through the resin injection opening 12 formed in the lower mold 3 and connected to the resin injection line 13, toward the preform 5 within the mold cavity 4, for impregnation. Incidentally, in the invention, as mentioned above, when the matrix resin is to be injected and impregnated into the preform, it is sufficient that the inside of the mold cavity is brought into a depressurized state or the matrix resin to be injected is brought into a pressurized state. However, if, as shown in FIGS. 4 and 5, using a pressurization source 20, via the resin pot 11, the resin is brought into a pressurized state through the resin injection opening 12 formed in the lower mold to use a combination of the depressurized state inside the mold cavity and the pressurized state of the matrix resin, the matrix resin is more certainly injected and impregnated into the preform 5. Furthermore, similarly to the first embodiment, a resin diffusion medium 21 is interposed between the lower mold 3 and the preform 5 so that, via the resin diffusion medium 21, the matrix resin can be injected and impregnated into the preform 5 in a state of being more uniformly diffused.

In this embodiment, the upper mold 2 and the lower mold 3 are fixed using upper mold/lower mold fixing jigs 23 to such an extent that injecting the matrix resin that has been pressurized will not separate the upper mold 2 and the lower mold 3 while a void space between the upper mold 2 and the lower mold 3 is secured, and then a certain amount of the pressurized fluid is introduced to the insides of the bladder bags 22 to expand the bladder bags 22. During this state, a void space between the upper mold 2 and the lower mold 3 is secured, so that the preform is in a state of low Vf. Then, through the use of the vacuum pump 18, via the resin trap 19, the inside of the mold cavity 4 is brought to a depressurized state by suction through the vacuum suction opening 15 formed in the lower mold 3, and the matrix resin is pressurized and injected so that the matrix resin is injected and impregnated into the preform 5. Before long, the matrix resin is impregnated into the entire preform 5. When, after completion of the impregnation, the matrix resin flows out from the vacuum suction opening 15, the supply of the matrix resin is stopped.

After the preform 5 in a low-Vf state is sufficiently favorably impregnated with the matrix resin in this manner, the resin injected and impregnated in surplus in the preform 5 is sucked and removed via the vacuum suction line 16 for the matrix resin, which is used as described above, as shown in FIG. 5. At this time, the pressurized fluid is further introduced to the insides of the bladder bags 22 to raise the internal pressure of the bladder bags 22, so that the amount of squeeze of the O-ring 9 as seal means increases and the thickness of the base portion of the preform 5 gradually becomes thinner until surfaces of the upper mold 2 and the lower mold 3 contact each other and stop. Thus, the thickness of the base portion of the preform 5 is controlled so as to be equal to a predetermined product's thickness.

Furthermore, similarly, after the matrix resin impregnation is completed, the pressurized fluid is further introduced into the bag body 24 to raise the internal pressure of the bag body 24, whereby the bag body 24 is further expanded, moving the inner mold 6 toward the protruded portion 10 of the lower mold. Therefore, the reinforcement portions of the preform 5 are pressurized by the inner mold 6 so that the plate thickness thereof gradually becomes thinner. Then, the inner mold 6 comes into contact with the spacer 17 disposed in the mold cavity 4, so that the operation of the inner mold 6 stops. Thus, the operation distance can be controlled, that is, can be controlled so that the reinforcement portions of the preform 5 have the predetermined product's thickness.

The matrix resin impregnated in the preform 5 whose thickness is kept equal to the predetermined product's thickness in this manner is hardened, so that a targeted high-Vf FRP molded article is obtained. It suffices that after the hardening of the resin is completed, the mold is opened and the molded article is taken out.

If the bag body 24 has a tight closure characteristic that does not allow air to leak when compressed air is sent into the bag body 24, an expansion characteristic of enlarging in volume, and a strength such that the bag body does not rupture until predetermined temperature and size are reached, the material and the configuration thereof are not particularly limited. However, it is preferable to use, for example, a bag body obtained by tightly sealing a film made of a resin such as nylon or polypropylene into a bag shape or a bag body obtained by adhering a rubber-state sheet whose material is silicone rubber, butyl rubber, etc., into a bag shape.

If the spacer 17 has such dimensions as to come into contact with the inner mold 6 and therefore stop the movement of the inner mold 6 when the preform 5 comes to have a predetermined plate thickness, the material and the configuration thereof are not particularly limited. However, from the viewpoint of durability, it is preferable that the upper mold 2, the lower mold 3, and the inner mold 6 be made of the same material; for example, steel and aluminum are preferable. Furthermore, from the viewpoint of thermal expansion, the material thereof is more preferred to be Invar. Furthermore, the spacer 17 may be a single body separate from the mold die, or may also be integrated with the inner mold 6, the lower mold 3, or the upper mold 2. Incidentally, the means for controlling the amount of movement of the inner mold by a spacer is not limited to the second embodiment, but can be suitably utilized in the invention.

Figure 6:
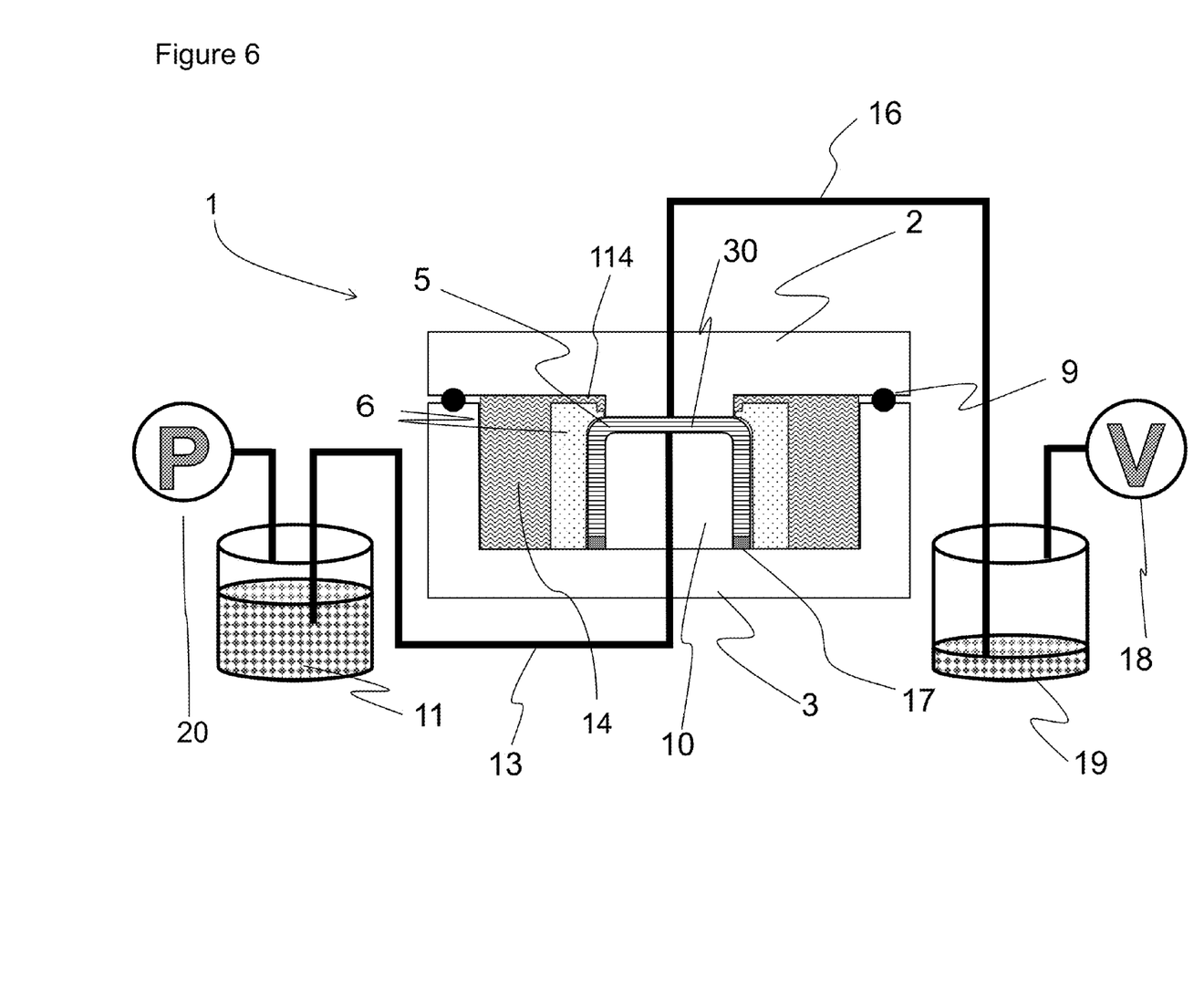
FIG. 6 is a longitudinal sectional view of a production apparatus for use in a production method for an FRP according to still another embodiment of the invention.

FIG. 6 shows a longitudinal sectional view of a production apparatus for use in a production method for an FRP according to a third embodiment. A thermally expansive body 14 is disposed between an inner mold 6 and side walls of a lower mold 3. The thermally expansive body 14 has an extended portion 114. In order to dispose the extended portion 114 in a gap between the inner mold 6 and an upper mold 2, the upper mold 2 has a protruded portion of the upper mold at a position that corresponds to a protruded portion 10 of the lower mold 3. Therefore, a sectional shape of a mold cavity 4 formed by the upper mold 2 and the lower mold 3 is an H shape. Within the mold cavity 4, a preform 5 made up of a reinforcing fiber substrate having a C-shaped sectional shape composed of a base portion 30 and reinforcement portions 31 is disposed, as a three-dimensionally shaped preform, so as to lie along the protruded portion 10 of the lower mold. The thermally expansive body 14, in this embodiment, is disposed in the gap between the inner mold and the lower mold and the extended portion 114 is disposed in a gap between the inner mold and the upper mold. However, corresponding to the shapes of a molded article and the mold die, the thermally expansive body may be disposed in a gap between the inner mold and the upper mold, and the extended portion 114 may be disposed in a gap between the inner mold and the lower mold.

Similarly to the embodiments described so far, after a state in which the preform 5 has been easily and sufficiently favorably impregnated with the matrix resin despite a low-Vf state is formed, at least one of the upper mold and the lower mold is operated toward the other and also the thermally expansive body 14 is expanded by heating the inside of the mold cavity 4, so that the inner mold 6 is pressed by the thermally expansive body 14 so as to operate a predetermined amount in a lateral direction different from the up-down directions. Due to this, a dimension of the mold cavity 4 in the lateral direction is controlled so that the thickness of the preform 5 disposed within the mold cavity 4 becomes equal to a product thickness. Subsequently, by heating to a molding temperature, the matrix resin is hardened. By heating the thermally expansive body present between the inner mold 6 and the upper mold 2, the extended portion 114 of the thermally expansive body also thermally expands so that the gap between the inner mold 6 and the upper mold 2 in which the extended portion 114 is disposed can be certainly sealed, both on lateral surfaces and on vertical surfaces. Furthermore, if the temperature at the time of mold removal is caused to be lower than the molding temperature, the extended portion 114 also thermally contracts, starting when the matrix resin is hardened, and therefore a gap between the inner mold 6 and the upper mold 2 where the extended portion 114 is disposed is formed, so that the molded article can be easily removed from the mold.

Figure 7:
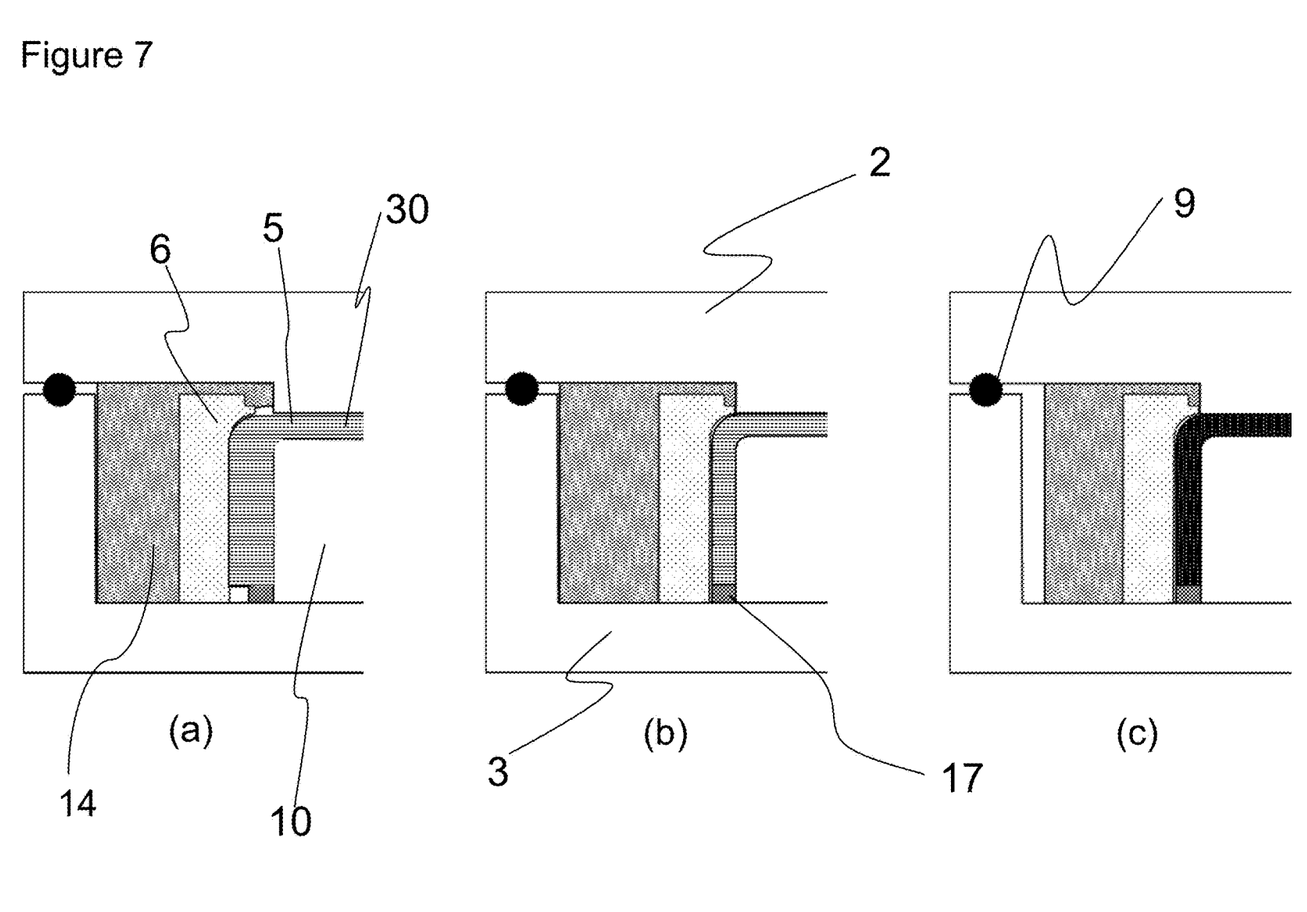
FIG. 7 is a partial general longitudinal sectional view of a mold die, showing (a) the positions of an inner mold and a thermally expansive body before impregnation with a matrix resin, (b) the positions of the inner mold and the thermally expansive body at the time of hardening the matrix resin, and (c) the positions of the inner mold and the thermally expansive body at the time of mold removal.

FIG. 7 is an enlargement of a one-side portion of the mold die of the production apparatus for an FRP shown in FIG. 6. In FIG. 7, (a), (b), and (c) show, in schematic diagrams, positional relations regarding (a) the inner mold and the thermally expansive body at the time of impregnation with the matrix resin, (b) the inner mold and the thermally expansive body at the time of hardening the matrix resin, and (c) the inner mold and the thermally expansive body at the time of mold removal, respectively.

At the time of impregnation with the matrix resin, the preform 5, as shown in FIG. 7(a), is in a state in which the plate thickness thereof is greater than the thickness of the product, and is low in Vf, so that the matrix resin is easily impregnated into the preform 5. Then, when the matrix resin is hardened, the molding temperature is made higher than the temperature at the time of impregnation with the resin, so that as shown in FIG. 7 (b), the thermally expansive body 14 thermally expands from the state shown in FIG. 7(a) so that the inner mold 6 comes into contact with the spacer 17. Thus, the preform 5 is controlled to the thickness of the product. When the molded article obtained by molding is removed from the mold, the temperature at the time of mold removal is made lower than the molding temperature, so that the thermally expansive body 14 thermally contracts from the state shown in FIG. 7 (b). Therefore, void space is formed in the mold cavity as shown in FIG. 7(c), so that the molded article can be easily removed from the mold.

Figure 8:
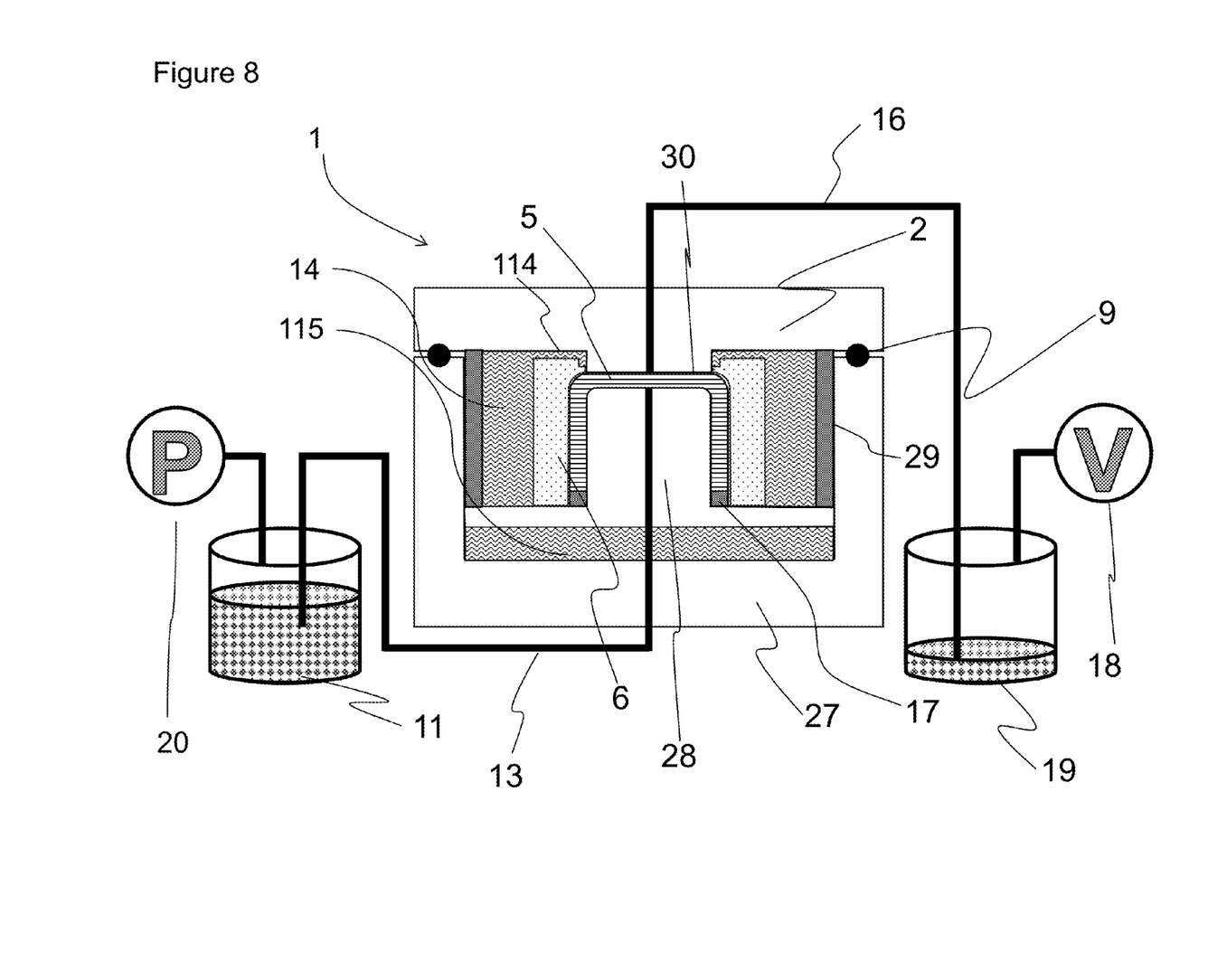
FIG. 8 is a longitudinal sectional view of a production apparatus for use in a production method for an FRP according to a further embodiment of the invention.

FIG. 8 exemplifies a mode in which, in the embodiment shown in FIG. 6, the lower mold is composed of a frame body 27 and a hat-shaped protruded portion 28, and a bottom-portion thermally expansive body 115 is disposed between the frame body 27 and the hat-shaped protruded portion 28, and in which the bottom-portion thermally expansive body 115 is expanded by heating so that the hat-shaped protruded portion 28 of the lower mold 3 is operated toward the upper mold 2 and therefore the preform is pressurized. In order to fix the position of the upper mold 2 when the hat-shaped protruded portion 28 that constitutes the lower mold is operated toward the upper mold 2 side, an upper mold fixing jig that is not depicted is used. As the upper mold fixing jig, it suffices that publicly known means, such as a clamp or a pressure apparatus, is used. Together with the pressurization by the upper mold and the lower mold, the suction and removal of surplus resin is performed via the vacuum suction line 16. In the mold cavity there is disposed an up-down direction spacer 29 whose length has been adjusted so that the up-down direction spacer 29 comes into contact with each of the upper mold 2 and the hat-shape protruded portion 28 when the thickness of the base portion becomes equal to the thickness of the product. By utilizing the contact of the up-down direction spacer 29 and the upper mold 2, the movement distance of the hat-shape protruded portion 28 can be controlled.

Incidentally, as for the thermally expansive body 14 and the bottom-portion thermally expansive body 115, if they have a greater thermal expansion coefficient than the material of the molds, the material and the configuration thereof are not particularly limited. However, it is preferable to use a material whose linear expansion coefficient is large; for example, elastomer can be used. As for a thermally expansive body or a bottom-portion thermally expansive body suitable in the invention, the linear expansion coefficient thereof is preferred to be greater than or equal to $1.0 \times 10^{-4}/°$ C. and is more preferred to be greater than or equal to $1.5 \times 10^{-4}/°$ C. and less or equal to $3.0 \times 10^{-4}/°$ C. With regard to the thermally expansive body or the bottom-portion thermally expansive body, it is particularly preferable to use silicone rubber, taking into consideration the mold release characteristic, the thermal expansion characteristic, and the flexibility.

Figure 9:
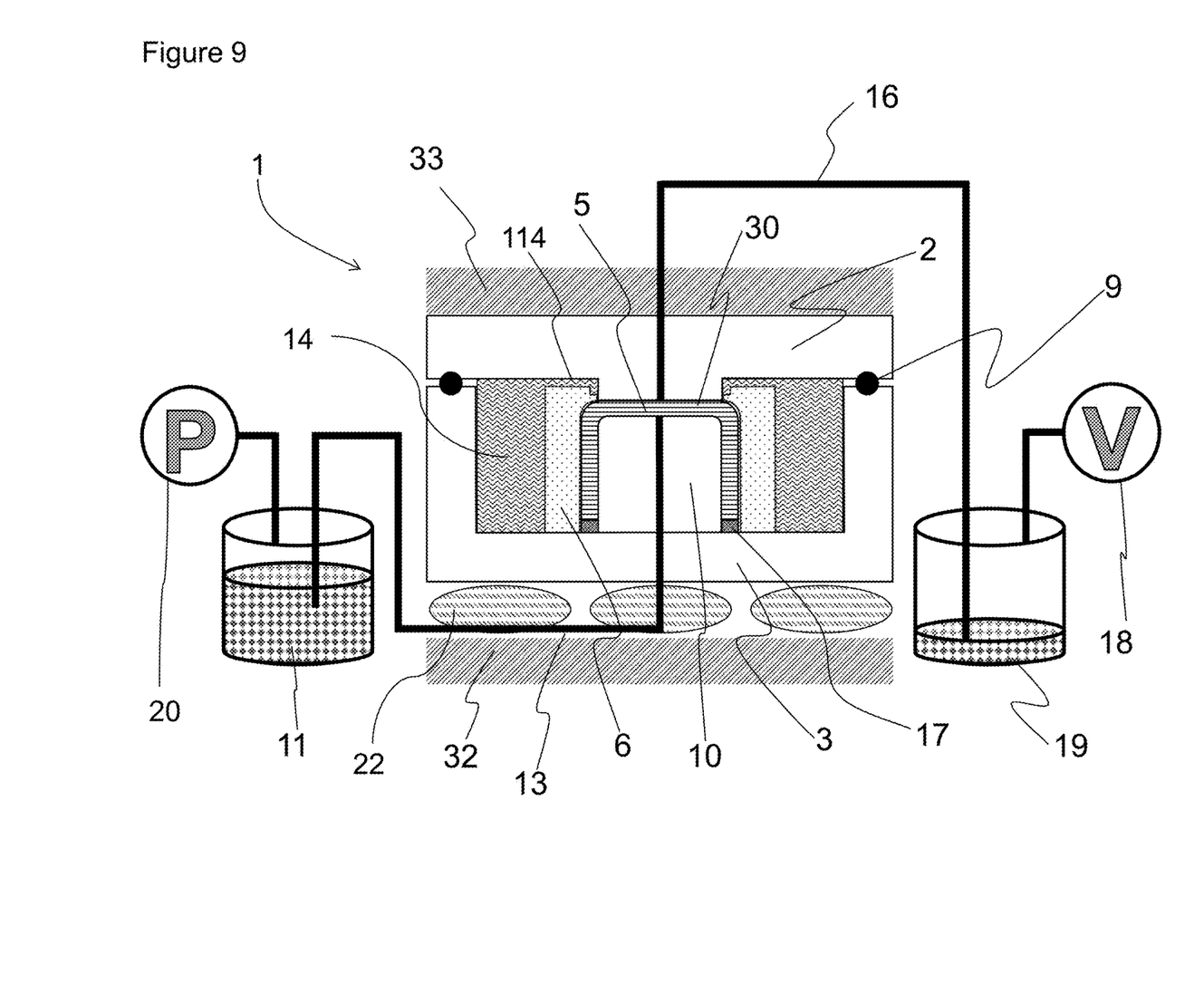
FIG. 9 is a longitudinal sectional view of a production apparatus for use in a production method for an FRP according to a further embodiment of the invention.

In an embodiment shown in FIG. 9, in addition to the embodiment shown in FIG. 6, a plurality of bladder bags 22 are disposed at a lower side of the lower mold 3 that is positioned at an outside of the lower mold 3 that is at an opposite side of the lower mold 3 to the mold cavity 4, in order to operate the lower mold 3 toward the upper mold 2 side so that the preform is pressurized. Although in FIG. 9, the bladder bags 22 are disposed on top of a lower mold fixing jig 32 in such a manner as to raise the lower mold, bladder bags may be disposed on top of the upper mold so as to push down the upper mold. Furthermore, instead of the bladder bags 22, it is also possible to dispose a member that has thermal expansibility and that is made of substantially the same material as the thermally expansive body. At this time, in order to fix the position of the upper mold 2, an upper mold fixing jig 33 is used. As the lower mold fixing jig 32 and the upper mold fixing jig 33, use of publicly known means, such as a clamp or a press apparatus, suffices. In order to operate the lower mold 3 toward the upper mold 2 side, the lower mold 3 is pressurized toward the upper mold 2 and the suction and removal of surplus resin is performed via the suction line 16.

As described above, in the invention, the thickness of the base portion of the preform 5 can be controlled by the degree of depressurization of the mold cavity 4 or pressure from an external member such as the bladder bags 22. For example, using the O-ring 9 whose amount of squeeze is large, the thickness of the base portion of the preform 5 can be controlled by the degree of depressurization or the pressure, from a correlation between the degree of depressurization or the pressure and the amount of squeeze. Alternatively, the thickness of the base portion may be controlled by, for example, disposing a void space adjusting plate made of resin or made of rubber beforehand between the upper mold 2 and the lower mold 3, and, subsequently to the resin impregnation in the preform, controlling the thickness of the void space adjusting plate by the squeeze caused by pressure from an external member such as the bladder bags 22 or by the thermal expansion caused by temperature load from an external member.

Figure 10:
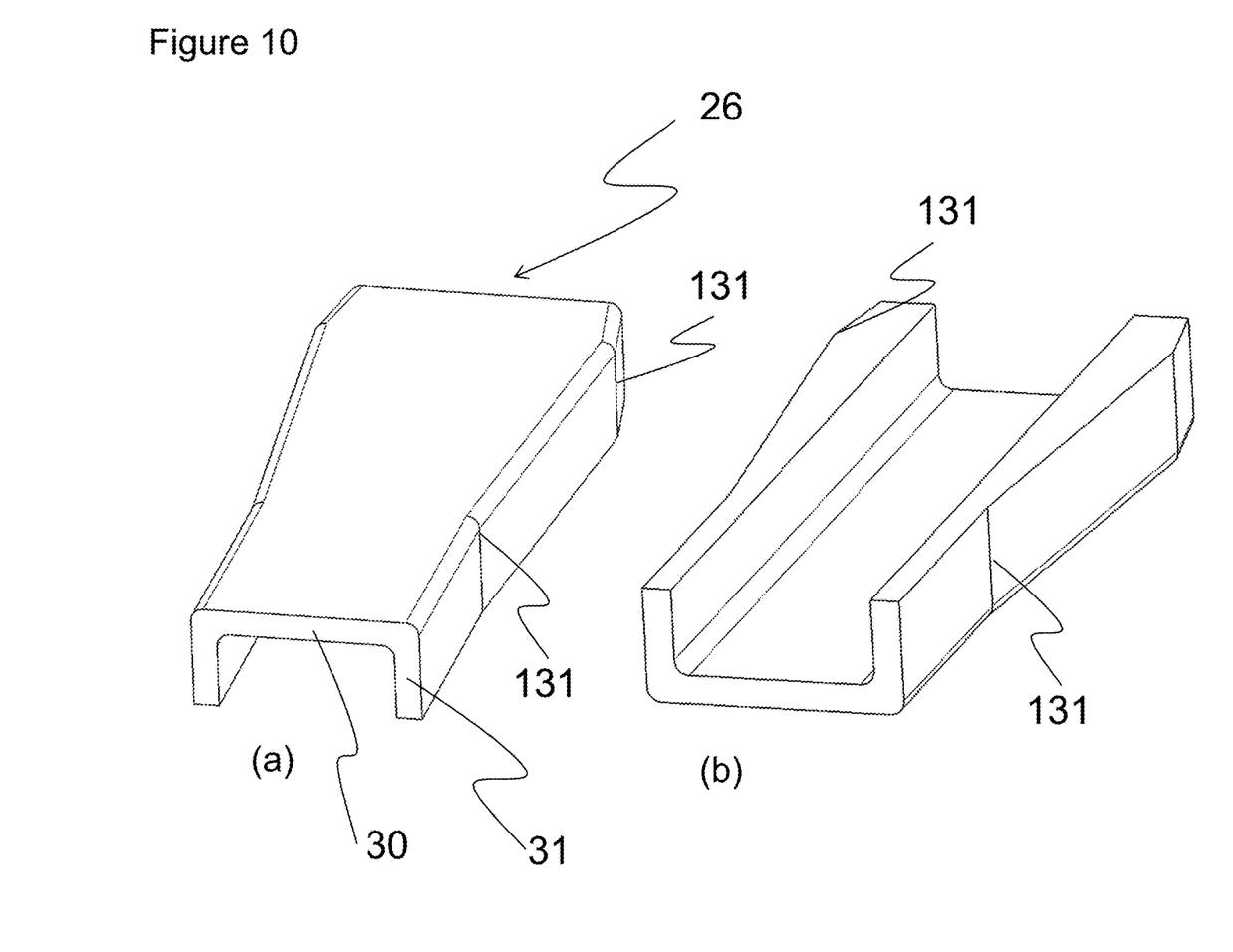
FIG. 10 is a general perspective view showing a preform for use for a molded article that can be suitably obtained by a production method for an FRP according to the invention.

FIG. 10 is a perspective view showing a preform for use for a molded article that has a point of change in plate thickness in a lengthwise direction. In FIG. 10, (b) shows a reverse surface of what is shown in (a). Herein, the point of change in plate thickness means a portion of a corner where the plate thickness starts to change in a cross-section. In the case where the preform 26 has a point 131 of change in plate thickness in the lengthwise direction, inner molds 6 can be disposed individually at sites that are different in plate thickness and the amounts of movement of the inner molds 6 can be individually controlled according to the changing plate thickness. For example, by reducing the amount of movement of an inner mold 6 in a portion whose plate thickness is thick and increasing the amount of movement of an inner mold 6 in a thin portion, a molded article whose fiber volume content rate is high and stable can be obtained.

That is, in the case where the preform 26 shown in FIG. 10 is applied to the production apparatus of the first embodiment as shown in FIG. 1, it suffices that a plurality of inner molds 6 are disposed in the lengthwise direction of the preform 26 and the amounts of movement of the inner molds 6 are individually controlled by the bar-shaped bodies 7 inserted in a plurality of through holes 8 (FIG. 1 exemplifies three through holes).

Furthermore, in the case where the preform 26 shown in FIG. 10 is applied to the production apparatus of the third embodiment as shown in FIG. 6, it suffices that a plurality of inner molds 6 are disposed in the lengthwise direction of the preform 26 and the amounts of movement of the inner molds 6 are individually controlled by a plurality of thermal expansive bodies 14.

Thus, according to the invention, using a simple molding apparatus, a high-Vf molded article can be produced with excellent molding operation characteristic in a short time, and it becomes possible to easily and efficiently produce even a structural body which has a three-dimensional shape and whose thickness is comparatively thick.

INDUSTRIAL APPLICABILITY

The production method and apparatus for an FRP according to the invention are capable of being applied to production of substantially all kinds of molded articles made of FRP, and can be suitably applied particularly to large-size structural bodies that are required to have high quality, such as component parts of aircrafts and windmills.

EXPLANATION OF NUMERALS

1: production apparatus for an FRP
2: upper mold
3: lower mold
4: mold cavity
5: preform
6: inner mold
7: bar-shaped body
8: through hole
9: O-ring
10: protruded portion of the lower mold
11: resin pot
12: resin injection opening
13: resin injection line
14: thermally expansive body
114: thermally expansive body extended portion
115: bottom-portion thermally expansive body
15: vacuum suction opening
16: vacuum suction line
17: spacer
18: vacuum pump
19: resin trap 20: pressurization source
21: resin diffusion medium
22: bladder bag
23: upper mold/lower mold fixing jig
24: bag body
25: pressurized fluid introduction hole for a bag body
26: preform having a point of change in plate thickness in a lengthwise direction
27: frame body
28: hat-shape protruded portion
29: up-down direction spacer
30: base portion
31: reinforcement portion
131: point of change in plate thickness
32: lower mold fixing jig
33: upper mold fixing jig

The invention claimed is:

1. A production method for a fiber-reinforced plastic, in which
    a preform made of a reinforcing fiber substrate and having a three-dimensional shape and an inner mold which operates in a lateral direction different from an up-down direction are disposed in a mold cavity formed by an upper mold and a lower mold,
    a state in which a plate thickness of the preform has been made greater than a thickness of a molded article to be obtained is brought about,
    a matrix resin is injected and impregnated into the preform, and, after that, at least one of the upper mold and the lower mold is operated toward the other and the inner mold is operated in the lateral direction to pressurize the preform so that the thickness of the preform is controlled so as to be equal to the thickness of the molded article to be obtained, and
    subsequently the matrix resin is hardened by heating to obtain the molded article, wherein,
    the inner mold is operated by pressing the inner mold from an outside of the mold cavity, using a bar-shaped body inserted in a through hole that is provided in the upper mold or the lower mold and that provides communication between the outside of the mold cavity and an inside of the mold cavity.

2. The production method for the fiber-reinforced plastic according to claim 1, wherein the bar-shaped body is a male threaded bolt, and the bar-shaped body is rotated by a female thread provided on the through hole, and amount of movement of the bar-shaped body is controlled by number of rotations of the bar-shaped body.

3. The production method for the fiber-reinforced plastic according to claim 1, wherein operation distance of the inner mold is controlled by a spacer disposed in the mold cavity.

4. The production method for the fiber-reinforced plastic according to claim 1, wherein the preform is constituted of a base portion and a reinforcement portion.

5. The production method for the fiber-reinforced plastic according to claim 1, wherein the preform is constituted in a C-shaped sectional shape.

6. The production method for the fiber-reinforced plastic according to claim 1, wherein a plurality of inner molds are disposed in a lengthwise direction of the preform, and amounts of movement of the plurality of inner molds are individually controlled according to a shape of the preform.

7. The production method for the fiber-reinforced plastic according to claim 6, wherein the preform has a point of change in plate thickness in the lengthwise direction, and the inner molds are disposed individually at sites that are different in plate thickness, and the amounts of movement of the inner molds are individually controlled according to the plate thickness.

8. A production method for a fiber-reinforced plastic, in which
    a preform made of a reinforcing fiber substrate and having a three-dimensional shape and an inner mold which operates in a lateral direction different from an up-down direction are disposed in a mold cavity formed by an upper mold and a lower mold,
    a state in which a plate thickness of the preform has been made greater than a thickness of a molded article to be obtained is brought about,
    a matrix resin is injected and impregnated into the preform, and, after that, at least one of the upper mold and the lower mold is operated toward the other and the inner mold is operated in the lateral direction to pressurize the preform so that the thickness of the preform is controlled so as to be equal to the thickness of the molded article to be obtained, and
    subsequently the matrix resin is hardened by heating to obtain the molded article,
    wherein a thermally expansive body is disposed in a gap between the inner mold and the upper mold or the lower mold, and the inner mold is operated by thermally expanding the thermally expansive body by heating.

* * * * *